(12) United States Patent
Kim et al.

(10) Patent No.: US 9,572,210 B2
(45) Date of Patent: Feb. 14, 2017

(54) CONTROL CIRCUIT OF LIGHT-EMITTING DIODE LIGHTING APPARATUS

(71) Applicant: SILICON WORKS CO., LTD., Daejeon-si (KR)

(72) Inventors: Kyung Min Kim, Daejeon (KR); Yong Goo Kim, Daejeon (KR); Won Ji Lee, Cheonahn-si (KR); Jong Min Lee, Busan (KR); Young Suk Son, Daejeon (KR)

(73) Assignee: SILICON WORKS CO., LTD., Daejeon-si (KR)

( * ) Notice: Subject to any disclaimer, the term of this patent is extended or adjusted under 35 U.S.C. 154(b) by 0 days.

(21) Appl. No.: 14/649,008

(22) PCT Filed: Dec. 27, 2013

(86) PCT No.: PCT/KR2013/012350
§ 371 (c)(1),
(2) Date: Jun. 2, 2015

(87) PCT Pub. No.: WO2014/104843
PCT Pub. Date: Jul. 3, 2014

(65) Prior Publication Data
US 2015/0312984 A1  Oct. 29, 2015

(30) Foreign Application Priority Data

Dec. 28, 2012  (JP) .......................... 10-2012-0157279
Dec. 28, 2012  (JP) .......................... 10-2012-0157307

(51) Int. Cl.
*H05B 33/08*  (2006.01)

(52) U.S. Cl.
CPC ........ *H05B 33/0815* (2013.01); *H05B 33/083* (2013.01); *H05B 33/089* (2013.01); *H05B 33/0824* (2013.01); *H05B 33/0845* (2013.01)

(58) Field of Classification Search
CPC ....... H05B 37/02; H05B 33/08; H05B 33/083; H05B 33/0815; H05B 33/0809; H05B 33/0848; H05B 33/0824; H05B 33/0845
(Continued)

(56) References Cited

U.S. PATENT DOCUMENTS 7,081,722 B1 * 7/2006 Huynh ............... H05B 33/0818
315/185 S
8,164,276 B2 * 4/2012 Kuwabara ............ H05B 33/083
315/185 R
(Continued)

FOREIGN PATENT DOCUMENTS

CN  100581306  1/2010
CN  102498449  6/2012
(Continued)

OTHER PUBLICATIONS

Written Opinion with English translation for International Application No. PCT/KR2013/012350, dated May 8, 2014.
(Continued)

*Primary Examiner* — Thai Pham
(74) *Attorney, Agent, or Firm* — Kile Park Reed & Houtteman PLLC

(57) ABSTRACT

Disclosed is a control circuit of an LED lighting apparatus having a dimming function. The control circuit provides a current path corresponding to light emitting states of LED channels in response to a rectified voltage, and performs dimming by controlling a current amount of the current path in response to a dimming control signal provided as an analog signal or digital signal.

18 Claims, 16 Drawing Sheets

(58) Field of Classification Search
USPC ............... 315/121, 185 R, 186, 195, 209 R,
291,315/295, 308, 312
See application file for complete search history.

(56) References Cited

U.S. PATENT DOCUMENTS

| | | | |
|---|---|---|---|
| 8,901,829 B2* | 12/2014 | van de Ven | 315/152 |
| 2010/0308738 A1* | 12/2010 | Shteynberg | H05B 33/0812 315/185 R |
| 2011/0084619 A1* | 4/2011 | Gray | H05B 33/0824 315/185 R |
| 2013/0162144 A1* | 6/2013 | Lee | H05B 33/083 315/122 |
| 2014/0042918 A1* | 2/2014 | Lee | H05B 33/0824 315/185 R |

FOREIGN PATENT DOCUMENTS

| | | |
|---|---|---|
| CN | 102612196 | 7/2012 |
| KR | 20-2009-0007127 | 7/2009 |
| KR | 10-2011-0009846 | 1/2011 |
| KR | 10-2012-0008004 | 1/2012 |
| KR | 10-2012-0089112 | 8/2012 |
| KR | 10-2012-0112146 | 10/2012 |

OTHER PUBLICATIONS

International Search Report for International Application No. PCT/KR2013/012350, dated May 8, 2014.

* cited by examiner

CONTROL CIRCUIT OF LIGHT-EMITTING DIODE LIGHTING APPARATUS

BACKGROUND

1. Technical Field

The present disclosure relates to an LED lighting apparatus, and more particularly, to a control circuit of an LED lighting apparatus with a dimming control function.

2. Related Art

According to the recent trend of lighting technology, LEDs have been employed as light sources in order to reduce energy.

A high-brightness LED is differentiated from other light sources in terms of various aspects such as energy consumption, lifetime, and light quality.

However, a lighting apparatus using an LED as a light source requires a large number of additional circuits due to the characteristic of the LED which is driven by a constant current.

Examples of lighting apparatuses which have been developed to solve the above-described problem may include an AC direct-type lighting apparatus.

The AC direct-type LED lighting apparatus generates a rectified voltage from commercial AC power and drives an LED. Since the AC direct-type LED lighting apparatus directly uses the rectified voltage as an input voltage without using an inductor and a capacitor, the AC direct-type LED lighting apparatus has a satisfactory power factor. Hereafter, an LED lighting apparatus in accordance with an embodiment of the present invention refers to an AC direct-type LED lighting apparatus unless specifically described.

A general LED lighting apparatus is designed to be driven through a rectified voltage obtained by rectifying commercial power.

An LED lamp of the LED lighting apparatus generally includes a large number of LEDs connected in series.

Thus, the LED lighting apparatus is configured to provide a rectified voltage capable of turning on a large number of LEDs connected in series.

In general, the LED lighting apparatus may use a dimmer to control dimming.

Recently, as the technology related to the LED lighting apparatus is developed, various functions have been required to consider the convenience for use.

In particular, the LED lighting apparatus requires a function of additionally controlling dimming, in addition to a dimming control method using a dimmer.

Therefore, since the conventional LED lighting apparatus can control dimming through various methods, the LED lighting apparatus can improve the convenience and satisfaction of users. Thus, a function capable of improving the reliability of products needs to be developed.

Furthermore, the demand for large-capacity LED lighting apparatuses has gradually increased. However, when an LED lighting apparatus is manufactured with a large capacity, a large amount of current may flow into a chip forming a control unit which controls a current of a lamp.

When a large amount of current flows into the chip forming the control unit, excessive heat may be generated from the chip, and thus have an influence on a voltage for driving the lamp. In this case, the reliability of the product may be degraded due to the thermal stress.

Therefore, when the LED lighting apparatus is manufactured with a large capacity, the chip forming the control unit for controlling a current needs to be designed to control a heating problem.

SUMMARY

Various embodiments are directed to a control circuit of an LED lighting apparatus, which is capable of controlling dimming of a lamp using a voltage inputted from outside in an analog manner.

Also, various embodiments are directed to a control circuit of an LED lighting apparatus, which is capable of generating a pulse using a voltage inputted in an analog manner and regulating a current according to the duty of a pulse, thereby controlling dimming of a lamp.

Also, various embodiments are directed to a control circuit of an LED lighting apparatus, in which a switching element generating a large amount of heat among a plurality of switching element for providing a current path is arranged outside a chip and a switching element generating a small amount of heat is arranged inside the chip, thereby preventing excessive heat from being generated from the chi forming a control unit.

Also, various embodiments are directed to a control circuit of an LED lighting apparatus, which is capable of controlling dimming of a lamp using a dimming control pulse inputted from outside in a digital manner.

Also, various embodiments are directed to a control circuit of an LED lighting apparatus, which is capable of controlling dimming in a digital manner by driving switching elements forming a current path for light emission of a lamp using a dimming control pulse.

Also, various embodiments are directed to a control circuit of an LED lighting apparatus, which is capable of controlling dimming of a lamp by controlling a reference voltage using a dimming control pulse inputted from outside.

In an embodiment, there is provided a control circuit of an LED lighting apparatus which is divided into a plurality of LED channels. The control circuit may include a control unit provides a current path corresponding to turn-on states of the LED channels in response to a rectified voltage, generates a control pulse corresponding to an external dimming control signal therein, and controls a current amount of the current path according to the control pulse.

In an embodiment, there is provided a control circuit of an LED lighting apparatus which is divided into a plurality of LED channels. The control circuit may include a control unit provides a current path corresponding to turn-on states of the LED channels in response to a rectified voltage, and controls a current amount of the current path in response to the level of an external dimming control signal.

In an embodiment, there is provided a control circuit of an LED lighting apparatus which sequentially turns on a plurality of LED channels included in a lamp in response to a rectified voltage. The control circuit may include: a control unit including a plurality of switching circuits provided for the respective LED channels and provides a selective current path corresponding to sequential light emissions of the lamp; and a current sensing unit commonly connected to the switching circuits so as to form the current path, and provides the current sensing voltage. Each of one or more of the switching circuits may include a comparator compares the current sensing voltage to a reference voltage provided in response to the LED channel and an external switching element switched by an output of the comparator so as to form the current path and provided outside of a chip having the control unit mounted therein.

DETAILED DESCRIPTION

Figure 1:
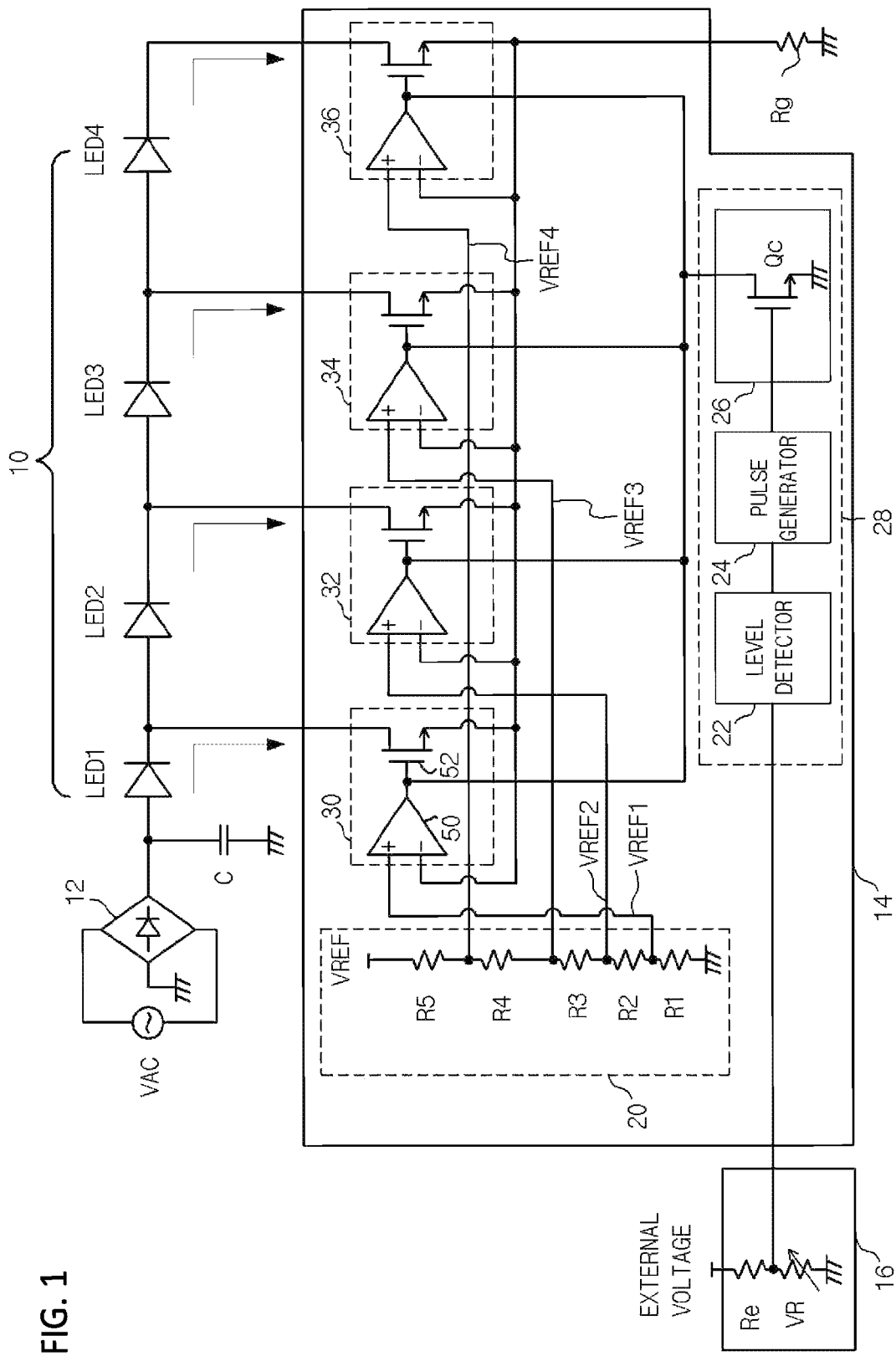
FIG. 1 is a circuit diagram illustrating a control circuit of an LED lighting apparatus in accordance with an embodiment of the present invention.

Exemplary embodiments will be described below in more detail with reference to the accompanying drawings. The disclosure may, however, be embodied in different forms and should not be constructed as limited to the embodiments set forth herein. Rather, these embodiments are provided so that this disclosure will be thorough and complete, and will fully convey the scope of the disclosure to those skilled in the art. Throughout the disclosure, like reference numerals refer to like parts throughout the various figures and embodiments of the disclosure.

The present invention discloses embodiments for controlling dimming of a lamp including LEDs without using a dimmer.

First, embodiments in which dimming control is performed through an external voltage inputted in an analog manner will be described.

In an embodiment of FIG. 1, an LED lighting apparatus may emit light using a rectified voltage, perform current regulation for light emission, and control dimming using a voltage inputted from outside in an analog manner.

Referring to FIG. 1, the LED lighting apparatus may include a lamp 10, a power supply unit, and a control unit 14. The power supply unit may provide a rectified voltage obtained by converting commercial power to the lamp 10, and the control unit 14 may provide a current path for light emission to each LED channel of the lamp 10.

The lamp 10 may include LEDs divided into a plurality of channels. The LED channels of the lamp 10 may be sequentially turned on/off by ripples of the rectified voltage provided from the power supply unit.

FIG. 1 illustrates that the lamp 10 includes four LED channels LED1 to LED4. Each of the LED channels LED1 to LED4 may include a plurality of LEDs. For convenience of description, the plurality of LEDs may be represented by one reference numeral.

The power supply unit may be configured to rectify an AC voltage of an AC power supply VAC and output the rectified voltage.

The power supply unit may include the AC power supply VAC having an AC voltage, a rectifier circuit 12 which rectifies the AC voltage and outputs the rectified voltage, and a capacitor C which smoothes the rectified voltage outputted from the rectifier circuit 12.

The AC power supply VAC may include a commercial power supply.

Figure 2:
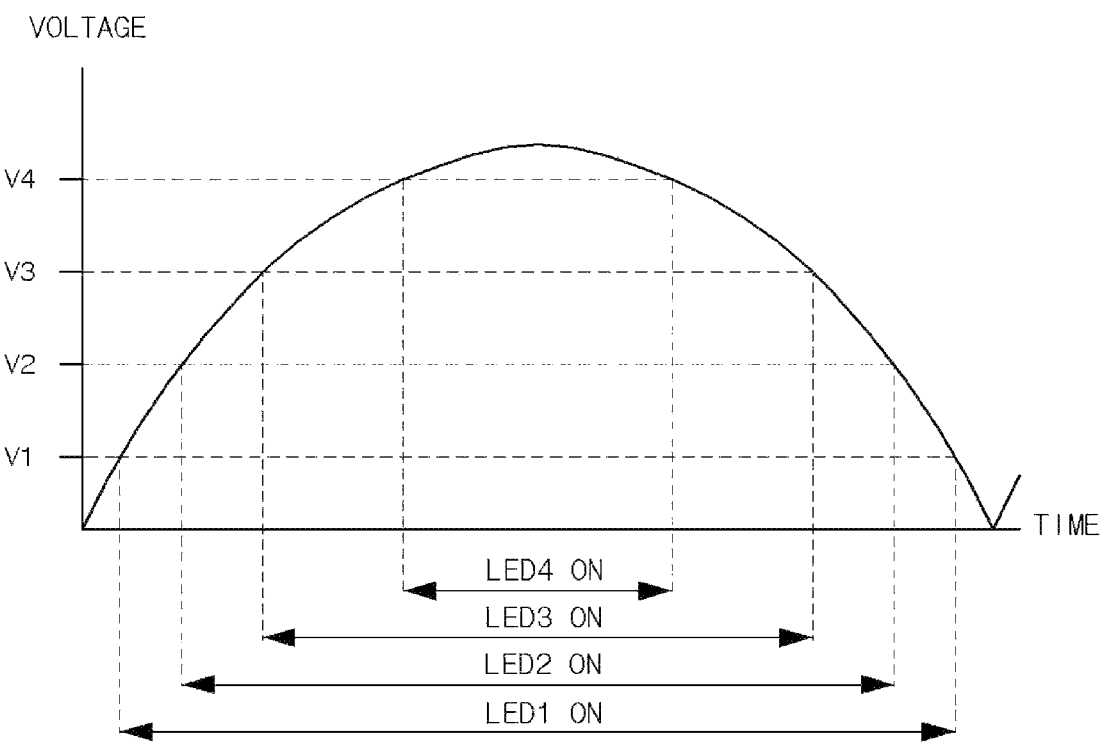
FIG. 2 is a waveform diagram for describing the operation of the embodiment of FIG. 1.

The rectifier circuit 12 may full-wave rectify a sine-wave AC voltage of the AC power supply VAC, and output the rectified voltage. As illustrated in FIG. 2, the rectified voltage may have a ripple where the voltage level rises/falls at each half cycle of the commercial AC voltage.

The control unit 14 may perform current regulation for light emission of the LED channels LED1 to LED4. The control unit 14 may provide a current path for current regulation through a current sensing unit including a current sensing resistor Rg of which one end is grounded.

In the embodiment of the present invention, the LED channels LED1 to LED4 of the lamp 10 may be sequentially turned on or off in response to a rise or fall of the rectified voltage.

When the rectified voltage rises to sequentially reach the light emitting voltages of the respective LED channels LED1 to LED4, the current control unit 14 may provide a current path for light emission of the respective LED channels LED1 to LED4.

At this time, a light emitting voltage which causes the LED channel LED4 to emit light may be defined as a voltage at which all of the LED channels LED1 to LED4 can emit light, a light emitting voltage which causes the LED channel LED3 to emit light may be defined as a voltage at which the LED channels LED1 to LED3 can emit light, a light emitting voltage which causes the LED channel LED2 to emit light may be defined as a voltage at which the LED channels LED1 and LED2 can emit light, and a light emitting voltage which causes the LED channel LED1 to emit light may be defined as a voltage at which only the LED channel LED1 can emit light.

The control unit 14 may detect a current sensing voltage through the current sensing resistor Rg. The current sensing voltage may be varied by a current path which is differently formed depending on a light emitting state of each LED channel of the lamp 10. At this time, the current flowing through the current sensing resistor Rg may include a constant current.

The control unit 14 may include a plurality of switching circuits 30, 32, 34, and 36 configured to provide a current path for the LED channels LED1 to LED4 and a reference voltage supply unit 20 configured to provide reference voltages VREF1 to VREF4.

The reference voltage supply unit 20 may include a plurality of resistors R1 to R5 which are connected in series so as to receive a constant voltage VREF.

The resistor R1 may be connected to the ground, and the resistor R5 may receive the constant voltage VREF. The resistor R5 may serve as a load resistor for adjusting an output. The resistors R1 to R4 may output the reference voltages VREF1 to VREF4 having different levels. Among the reference voltages VREF1 to VREF4, the reference voltage VREF1 may have the lowest voltage level, and the reference voltage VREF4 may have the highest voltage level.

The resistors R1 to R4 may be configured to output the reference voltages VREF1 to VREF4 of which the levels gradually rise in response to variations of the rectified voltage applied to the LEDs LED1 to LDE4.

The reference voltage VREF1 may have a level for turning off the switching circuit 30 at the time where the LED channel LED2 emits light. More specifically, the reference voltage VREF1 may be set to a lower level than the current sensing voltage which is formed in the current sensing resistor Rg by a light emitting voltage of the LED channel LED2.

The reference voltage VREF2 may have a level for turning off the switching circuit 32 at the time where the LED channel LED3 emits light. More specifically, the reference voltage VREF2 may be set to a lower level than a current sensing voltage which is formed in the current sensing resistor Rg by a light emitting voltage of the LED channel LED3.

The reference voltage VREF3 may have a level for turning off the switching circuit 34 at the time where the LED channel LED4 emits light. More specifically, the reference voltage VREF3 may be set to a lower level than a current sensing voltage which is formed in the current sensing resistor Rg by a light emitting voltage of the LED channel LED4.

The reference voltage VREF4 may be set to a higher level than the current sensing voltage which is formed in the current sensing resistor Rg by the maximum level of the rectified voltage.

The switching circuits 30, 32, 34, and 36 may be commonly connected to the current sensing resistor Rg which provides a current sensing voltage, in order to perform current regulation and to form a current path.

The switching circuits 30, 32, 34, and 36 may compare the current sensing voltage sensed through the current sensing resistor Rg to the reference voltages VREF1 to VREF4 of the reference voltage supply unit 20, respectively, and form a selective current path for turning on the lamp LA.

Each of the switching circuits 30, 32, 34, and 36 may receive a high-level reference voltage as the switching circuit is connected to an LED channel away from the position to which the rectified voltage is applied.

Each of the switching circuits 30, 32, 34, and 36 may include a comparator 50 and a switching element, and the switching element may include an NMOS transistor 52.

The comparator 50 included in each of the switching circuits 30 32, 34, and 36 may have a positive input terminal (+) configured to receive a reference voltage, a negative input terminal (−) configured to receive a current sensing voltage, and an output terminal configured to output a result obtained by comparing the reference voltage and the current sensing voltage.

Through the above-described configuration, the embodiment of FIG. 1 may perform an operation for light emission of the lamp. This operation will be described with reference to FIG. 2.

First, when a rectified voltage is in the initial state, the LED channels may be turned off. Thus, the current sensing resistor Rg may provide a current sensing voltage at a low level.

When the rectified voltage is in the initial state, all of the switching circuits 30, 32, 34, and 36 may maintain a turn-on state because the reference voltages VREF1 to VREF4 applied to the positive input terminals (+) thereof are higher than the current sensing voltage applied to the negative input terminals (−) thereof.

Then, when the rectified voltage rises to reach a light emitting voltage V1, the LED channel LED1 of the lamp 10 may emit light. Furthermore, when the LED channel LED1 of the lamp 10 emits light, the switching circuit 30 of the control unit 14, connected to the LED channel LED1, may provide a current path.

When the rectified voltage reaches the light emitting voltage V1 such that the LED channel LED1 emits light and the current path is formed through the switching circuit 30, the level of the current sensing voltage of the current sensing resistor Rg may rise. However, since the level of the current sensing voltage is low, the turn-on states of the switching circuits 30, 32, 34, and 36 may not be changed.

Then, when the rectified voltage continuously rises to reach a light emitting voltage V2, the LED channel LED2 of the lamp 10 may emit light. Furthermore, when the LED channel LED2 of the lamp 10 emits light, the switching circuit 32 of the control unit 14, connected to the LED channel LED2, may provide a current path. At this time, the LED channel LED1 may maintain a light emitting state.

When the rectified voltage reaches the light emitting voltage V2 such that the LED channel LED2 emits light and the current path is formed through the switching circuit 32, the level of the current sensing voltage of the current sensing resistor Rg may rise. At this time, the current sensing voltage may have a higher level than the reference voltage VREF1. Therefore, the NMOS transistor 52 of the switching circuit 30 may be turned off by an output of the comparator 50. That is, the switching circuit 30 may be turned off, and the switching circuit 32 may provide a selective current path corresponding to the light emission of the LED channel LED2.

Then, when the rectified voltage continuously rises to reach a light emitting voltage V3, the LED channel LED3 of the lamp 10 may emit light. Furthermore, when the LED channel LED3 of the lamp 10 emits light, the switching circuit 34 of the control unit 14, connected to the LED channel LED3, may provide a current path. At this time, the LED channels LED1 and LED2 may also maintain the light emitting state.

When the rectified voltage reaches the light emitting voltage V3 such that the LED channel LED3 emits light and the current path is formed through the switching circuit 34, the level of the current sensing voltage of the current sensing resistor Rg may rise. At this time, the current sensing voltage may have a higher level than the reference voltage VREF2. Therefore, the NMOS transistor 52 of the switching circuit 32 may be turned off by an output of the comparator 50. That is, the switching circuit 32 may be turned off, and the switching circuit 34 may provide a selective current path corresponding to the light emission of the LED channel LED3.

Then, when the rectified voltage continuously rises to reach a light emitting voltage V4, the LED channel LED4 of the lamp 10 may emit light. Furthermore, when the LED channel LED4 of the lamp 10 emits light, the switching circuit 36 of the control unit 14, connected to the LED channel LED4, may provide a current path. At this time, the LED channels LED1, LED2, and LED3 may also maintain the light emitting state.

When the rectified voltage reaches the light emitting voltage V4 such that the LED channel LED4 emits light and the current path is formed through the switching circuit 36, the level of the current sensing voltage of the current sensing resistor Rg may rise. At this time, the current sensing voltage may have a higher level than the reference voltage VREF3. Therefore, the NMOS transistor 52 of the switching circuit 34 may be turned off by an output of the comparator 50. That is, the switching circuit 34 may be turned off, and the switching circuit 36 may provide a selective current path corresponding to the light emission of the LED channel LED4.

Then, although the rectified voltage continuously rises, the switching circuit 36 may maintain the light emitting state, because the reference voltage VREF4 provided to the switching circuit 36 has a higher level than the current sensing voltage formed in the current sensing resistor Rg by the maximum level of the rectified voltage.

The rectified voltage may start to fall after rising to the maximum level.

When the rectified voltage falls below the light emitting voltage V4, the LED channel LED4 of the lamp 10 may be turned off.

When the LED channel LED4 is turned off, the lamp 10 may maintain the light emitting state using the LEDs LED3, LED2, and LED1. Thus, the current path may be formed by the switching circuit 34 connected to the LED channel LED3.

Then, when the rectified voltage continuously falls below the light emitting voltage V3, the light emitting voltage V2, and the light emitting voltage V1, the LED channels LED3, LED2, and LED1 of the lamp 10 may be sequentially turned off.

As the LED channels LED3, LED2, and LED1 of the lamp 10 are sequentially turned off, the control unit 14 may shift and provide a selective current path formed by the switching circuits 34, 32, and 30.

The embodiment of FIG. 1 may include a dimming circuit for dimming control. The dimming circuit may include a level detector 22, a pulse generator 24, and a pulse driver 26. The dimming circuit 28 may be included in the control unit 14.

In the embodiment of FIG. 1, the control unit 14 may be configured to receive an analog dimming control signal from outside. The analog dimming control signal may indicate a dimming control voltage generated through an external voltage, and the dimming control voltage may be generated by a dimming control unit 16 and provided to the control unit 14.

The dimming control unit 16 may include a variable resistor VR and a resistor Re for dividing the external voltage, and the resistor Re and the variable resistor VR may be connected in series to each other. The dimming control voltage may be outputted from a node to which the resistor Re and the variable resistor VR are connected.

Figure 3:
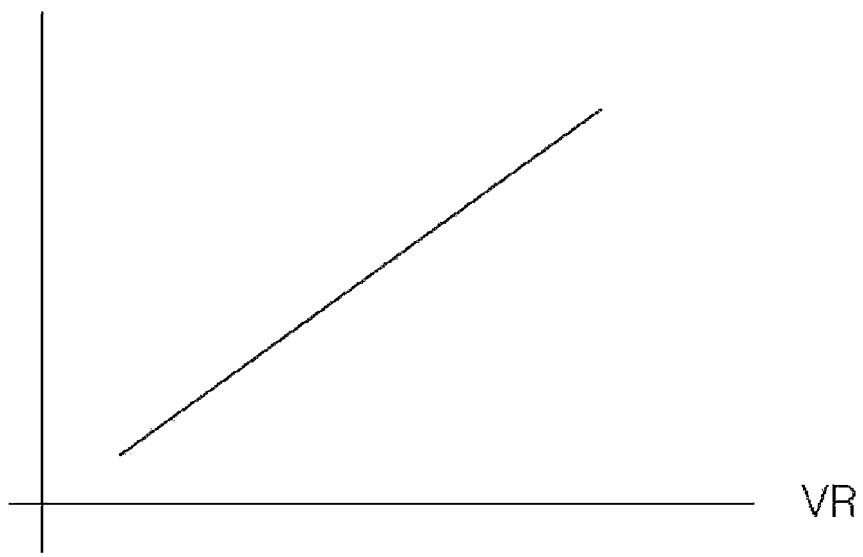
FIG. 3 is a graph illustrating an input of a dimming control voltage based on control of a dimming control unit.

The external voltage may be applied as a constant voltage. The variable resistor VR may have a variable resistance value. As the resistance value of the variable resistor VR is varied, the dimming control unit 16 may adjust the dimming control voltage at a scale illustrated in FIG. 3, and then provided the adjusted dimming control voltage.

Figure 4:
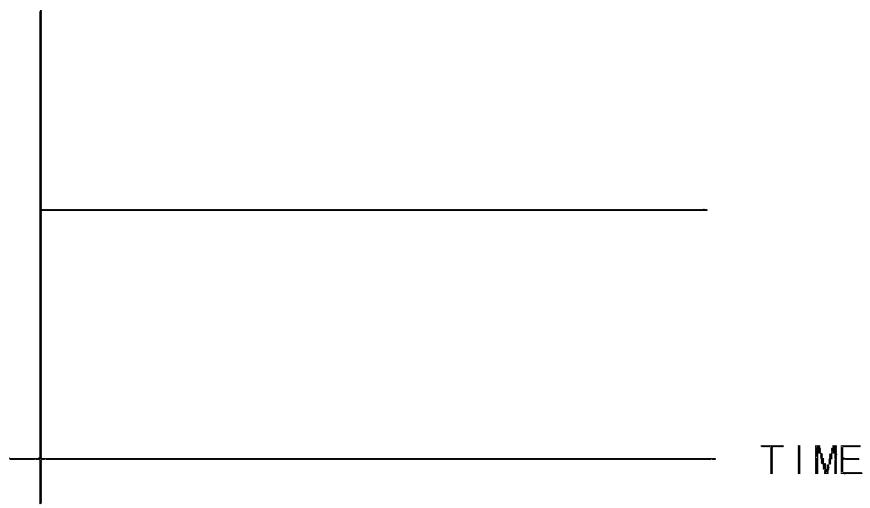
FIG. 4 is a graph illustrating an output of a level detector.

The level detector 22 may detect the level of the dimming control voltage inputted from the dimming control unit 16, and output the detected level as a constant voltage as illustrated in FIG. 4.

The pulse generator 24 may generate a control pulse having a duty corresponding to the DC level of the constant voltage applied to the level detector 22. For example, the pulse generator 24 may generate a control pulse having a large duty when the level of the constant voltage is high, and generate a control pulse having a small duty when the level of the constant voltage is low.

Figure 5:
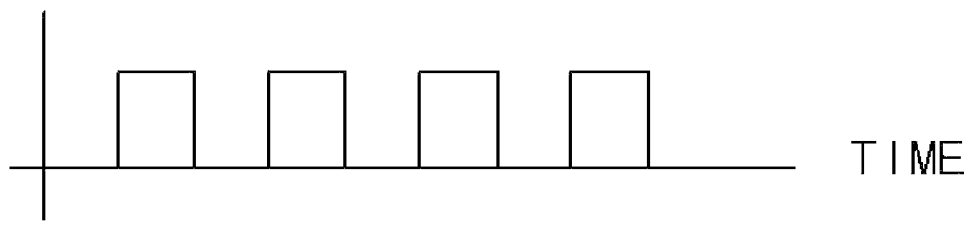
FIG. 5 is a waveform diagram illustrating an example of a pulse outputted from a pulse generator.
Figure 6:
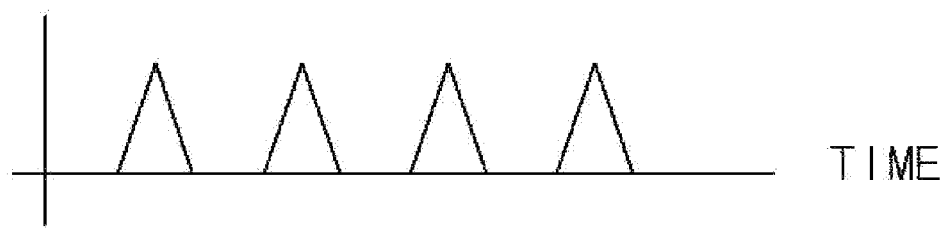
FIG. 6 is a waveform diagram illustrating another example of a pulse outputted from a pulse generator.

The pulse generator 24 may be configured to output any one of a square wave illustrated in FIG. 5 and a triangle wave illustrated in FIG. 6.

The pulse driver 26 may include an NMOS transistor Qc, and the source of the NMOS transistor Qc may be commonly connected to the gate of the switching element included in each of the switching circuits 30, 32, 34, and 36, that is, the NMOS transistor 52.

The control unit 14 having the dimming circuit 28 configured in the above-described manner may control the current amount of the current path which is selectively provided through the switching circuits 30, 32, 34, and 36 by the external dimming control voltage having a level corresponding to a desired dimming level.

More specifically, when the dimming control unit 16 provides the dimming control voltage having a level corresponding to the desired dimming level to the level detector 22, the level detector 22 may provide a constant voltage corresponding to the level of the dimming control voltage to the pulse generator 24.

The pulse generator 24 may generate a control pulse having a duty corresponding to the level of the constant voltage, and provide the generated control pulse to the pulse driver 26.

At this time, when the dimming control unit 16 outputs the dimming control voltage at a high level, the level detector 22 may provide a high-level constant voltage to the pulse generator 24, and the pulse generator 24 may provide a control pulse having a large duty to the pulse driver 26.

On the other hand, when the dimming control unit 16 outputs the dimming control voltage at a low level, the level detector 22 may provide a low-level constant voltage to the pulse generator 24, and the pulse generator 24 may provide a control pulse having a small duty to the pulse driver 26.

The pulse driver 26 may be periodically turned on/off according to the control pulse. The pulse driver 26 may be turned on/off to have a long turn-on time in response to the control pulse having a large duty, and turned on/off to have a short turn-on time in response to the control pulse having a small duty.

As the pulse driver 26 is driven, the gate voltages of the NMOS transistors 52 included in the switching circuits 30, 32, 34, and 36 may be changed.

That is, when the pulse driver 26 is turned on/off to have a long turn-on time, the NMOS transistors 52 of the switching circuits 30, 32, 34, and 36 may be turned on/ff to have a short turn-on time.

On the other hand, when the pulse driver 26 is turned on/off to have a short turn-on time, the NMOS transistors 52 of the switching circuits 30, 32, 34, and 36 may be turned on/ff to have a long turn-on time.

For example, suppose that the rectified voltage rises to the light emitting voltage V1 at which the LED channel LED1 emits light, and the current path of the LED channel LED1 is provided by the switching circuit 30.

When the dimming control voltage is applied at a high level, the pulse driver 26 may drive the gate of the NMOS transistor 52, and the NMOS transistor 52 of the switching circuit 30 may be turned on/off to have a short turn-on time. As a result, the amount of current flowing into the NMOS transistor 52 may decrease. Thus, the LED channel LED1 may be dimmed down.

On the other hand, when the dimming control voltage is applied at a low level, the pulse driver 26 may drive the gate of the NMOS transistor 52, and the NMOS transistor 52 of the switching circuit 30 may be turned on/off to have a long turn-on time. As a result, the amount of current flowing into the NMOS transistor 52 may increase. Thus, the LED channel LED1 may be dimmed up.

In the embodiment of FIG. 1, the dimming control may be achieved by a voltage inputted in an analog manner from outside, that is, the dimming control voltage.

The dimming control method for controlling the current amount of a current path using a dimming control voltage in accordance with the embodiment of the present invention may be used together with a general dimming control method of an LED lighting apparatus using a dimmer.

FIG. 1 illustrates that the pulse driver 26 is commonly connected to the switching circuits 30, 32, 34, and 36, but the present invention is not limited thereto. Although not illustrated in detail, a plurality of pulse drivers 26 may be configured to correspond one-to-one to the respective switching circuits 30, 32, 34, and 36. At this time, the pulse generator 24 may be configured to commonly provide a pulse to the plurality of pulse drivers 26.

The embodiment of FIG. 1 may adjust the turn-on time of the gate of the NMOS transistor 52 serving as the switching element included in each of the switching circuits 30, 32, 34, and 36 according to the dimming control voltage, and control the current flow on the current path, in order to perform dimming control.

Figure 7:
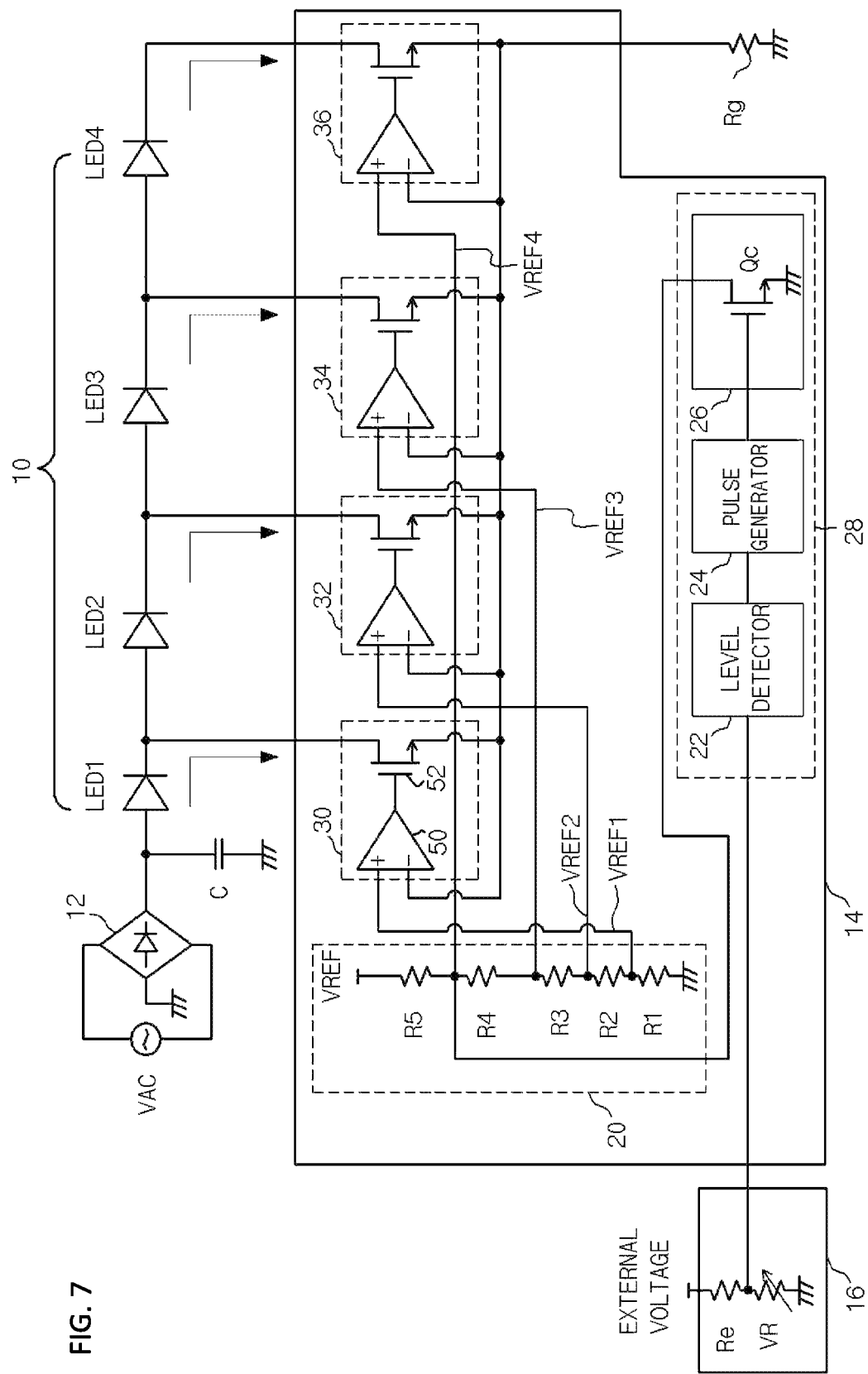
FIG. 7 is a circuit diagram illustrating a control circuit of an LED lighting apparatus in accordance with another embodiment of the present invention.

On the other hand, according to a producer's intention, the current amount for light emission of the lamp may be controlled by driving an output of the reference voltage of the reference voltage supply unit 20, as illustrated in FIG. 7.

In FIG. 7, the same parts as those of FIG. 1 are represented by like reference numerals, and duplicated descriptions thereof are omitted herein.

In the embodiment of FIG. 7, the pulse driver 26 may be connected to a node between the resistors R5 and R4 of the reference voltage supply unit 20.

That is, the pulse driver 26 may be configured to control the voltage of the node from which the highest reference voltage is outputted, among the nodes between the respective resistors formed in the reference voltage supply unit 20.

The pulse driver 26 may be periodically turned on/off according to the control pulse provided from the pulse generator 24. The pulse driver 26 may be turned on/off to have a long turn-on time in response to a control pulse having a large duty, and turned on/off to have a short turn-on time in response to a control pulse having a small duty.

The level of the node between the resistors R5 and R4 of the reference voltage supply unit 20 may fall to the ground voltage when the NMOS transistor Qc of the pulse driver 26 is turned on, and rise to the reference voltage VREF4 when the NMOS transistor Qc of the pulse driver 26 is turned off. Furthermore, the voltages of the nodes from which the other reference voltages VREF1, VREF2, and VREF3 are outputted may swing between the ground voltage and the respective reference voltages in connection with the operation of the pulse driver 26.

When the pulse driver 26 is turned on so that the levels of the reference voltages VREF1 to VREF4 fall to the ground voltage, the current sensing voltages applied to the negative terminals (−) of the respective comparators 50 may have a higher level than the ground voltage. Thus, the comparators 50 may output a low-level voltage to the gates of the respective transistor 52. In connection with the operation of the comparators 50, the NMOS transistors 52 included in the switching circuits 30, 32, 34, and 36 may be turned off, and the current path is blocked.

Furthermore, when the pulse driver 26 is turned off so that the reference voltages VREF1 to VREF4 are restored, the respective comparators 50 may perform a normal operation based on the level of a rectified voltage. Thus, according to the level of the rectified voltage, a selective current path may be provided through the switching circuits 30, 32, 34, and 36.

That is, the outputs of the comparators 50 of the respective switching circuits 30, 32, 34, and 36 may be controlled in connection with the operation of the pulse driver 26. As a result, the NMOS transistors 52 of the switching circuits 30, 32, 34, and 36 may be turned on/off in connection with the switching operation of the NMOS transistor Qc of the pulse driver 26.

The turn-on times of the NMOS transistors 52 of the switching circuits 30, 32, 34, and 36 and the NMOS transistor Qc of the pulse driver 26 may be determined according to the level of the dimming control voltage.

That is, when the dimming control voltage is applied at a high level, the pulse driver 26 may control the reference voltage, and the NMOS transistor 52 of the switching circuit 30 may be turned on/off to have a short turn-on time. As a result, the amount of current flowing into the NMOS transistor 52 may decrease. Therefore, the LED channel may be dimmed down.

On the other hand, when the dimming control voltage is applied at a low level, the pulse driver 26 may control the reference voltage, and the NMOS transistor 52 of the switching circuit 30 may be turned on/off to have a long turn-on time. As a result, the amount of current flowing into the NMOS transistor 52 may increase. Therefore, the LED channel may be dimmed up.

In the embodiment of FIG. 7, the dimming control may also be performed by a voltage inputted in an analog manner from outside, that is, the dimming control voltage, like the embodiment of FIG. 1.

Figure 8:
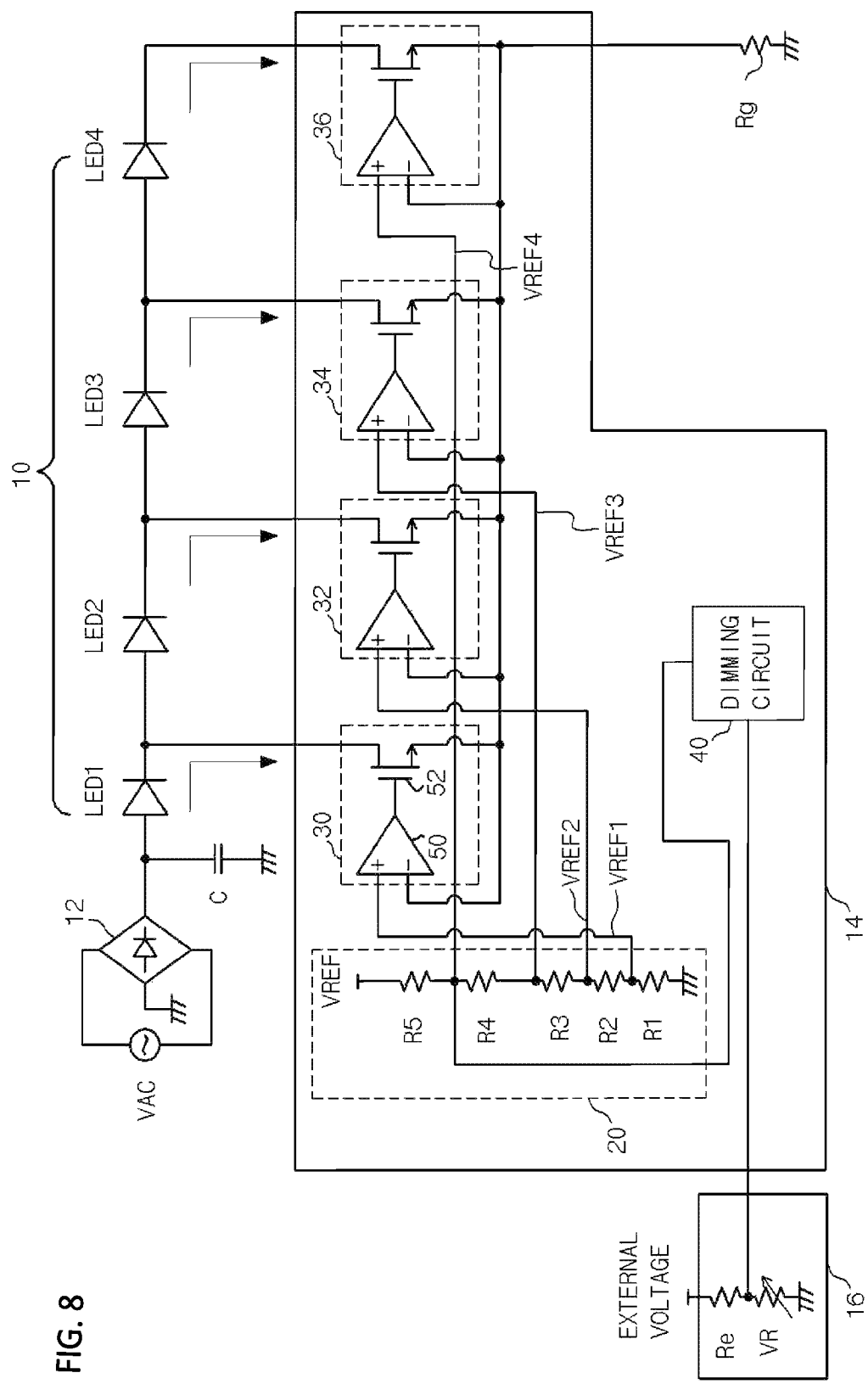
FIG. 8 is a circuit diagram illustrating a control circuit of an LED lighting apparatus in accordance with another embodiment of the present invention.

In an embodiment of FIG. 8, the control unit 14 may include a dimming circuit 40 which provides an adjustment voltage to the reference voltage supply unit 20 so as to control dimming.

In the embodiment of FIG. 8, the dimming circuit 40 may be configured to receive a dimming control voltage from the dimming control unit 16, as described with reference to FIGS. 1 and 7. However, the dimming circuit 40 may be configured to provide an adjustment voltage to the reference voltage supply unit 20, unlike the embodiments of FIGS. 1 and 7.

In FIG. 8, the same parts as those of FIGS. 1 and 7 are represented by like reference numerals, and the duplicated descriptions thereof are omitted herein.

The control unit 14 of FIG. 8 may control the dimming circuit 40 to generate an adjustment voltage having a level corresponding to an external dimming control voltage having a level corresponding to a desired dimming level. Furthermore, the control unit 15 may vary a reference voltage to have a level corresponding to the adjustment voltage, and control the current amount of a current path.

In response to the configuration of the control unit 14, the reference voltage supply unit 20 may generate the reference voltages REF1 to REF4 having different levels for the respective LED channels, and vary the reference voltages REF1 to REF4 to have a level corresponding to the adjustment voltage of the dimming circuit 40.

More specifically, the dimming circuit 40 of FIG. 8 may provide the adjustment voltage having a level corresponding to the dimming control voltage to the reference voltage supply unit 20, and the adjustment voltage may be applied to the node from which the highest reference voltage is outputted, among the nodes between the respective resistors of the reference voltage supply unit 20. That is, the adjustment voltage may be applied to the node from which the reference voltage REF4 is outputted, between the resistors R5 and R4 of the reference voltage supply unit 20.

Figure 9:
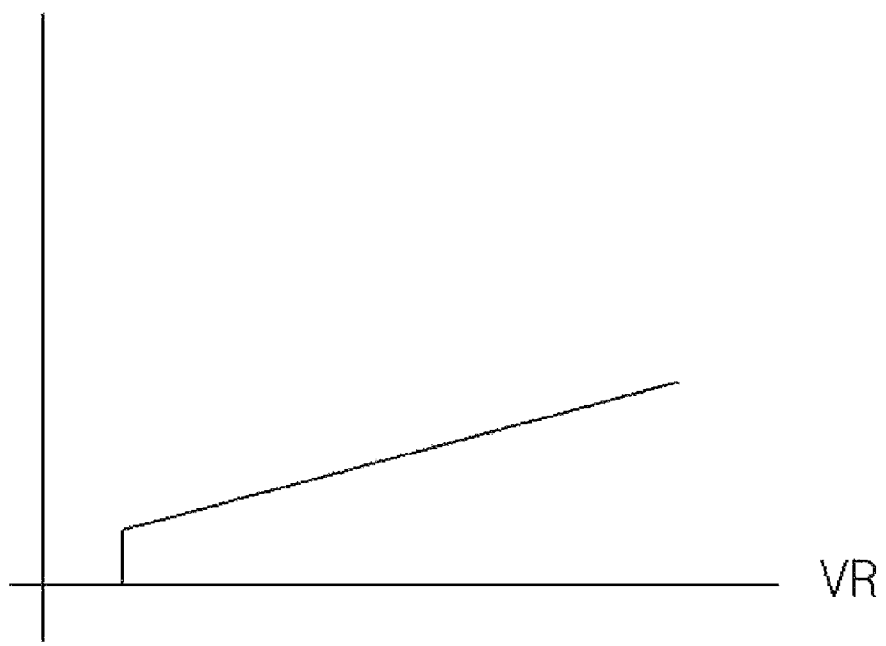
FIG. 9 is a graph illustrating an input of a dimming control voltage based on control of a dimming control unit in accordance with the embodiment of FIG. 8.

The dimming control unit 16 may output the dimming control voltage through the node between the resistor Re and the variable resistor VR. As the resistance value of the variable resistor VR is varied, the dimming control voltage may be outputted at a scale illustrated in FIG. 9.

The dimming circuit 40 may sense the level of the dimming control voltage provided from the dimming control unit 16, and output the sensed level as the adjustment voltage.

Figure 10:
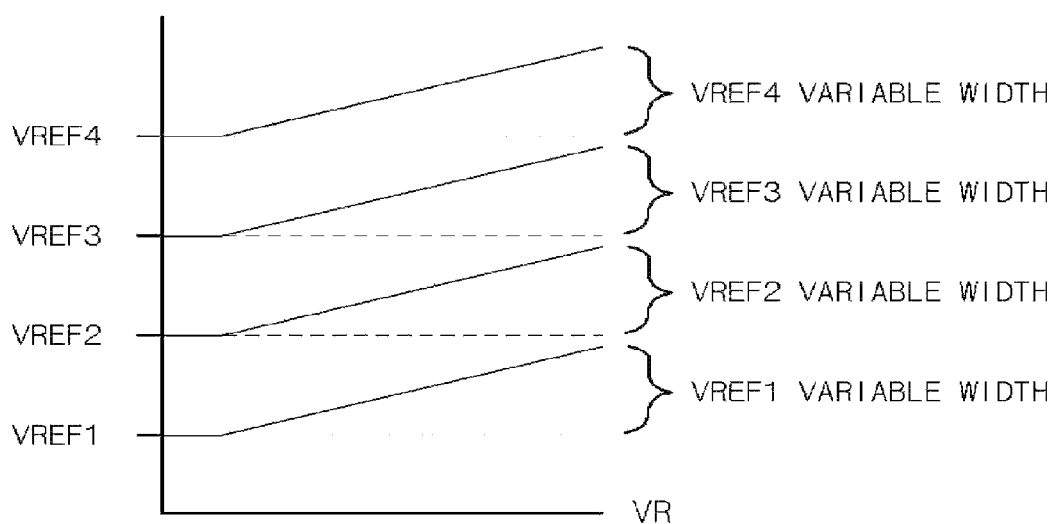
FIG. 10 is a graph illustrating changes of reference voltages in accordance with the embodiment of FIG. 8.

Through the above-described configuration, the reference voltage supply unit 20 may output the reference voltages REF1 to REF4 at levels which are varied according to the dimming control voltage, as illustrated in FIG. 10.

When the output of the comparator 50 is increased in each of the switching circuits 30, 32, 34, and 36, the current driving ability of the NMOS transistor 52 may be improved. On the other hand, when the output of the comparator 50 is decreased in each of the switching circuits 30, 32, 34, and 36, the current driving ability of the NMOS transistor 52 may be degraded.

In the embodiment of the present invention, when the dimming control unit 16 outputs the dimming control voltage at a high level, the dimming circuit 40 may also output the adjustment voltage at a high level.

Then, the high-level reference voltages REF1 to REF4 may be applied to the positive terminals (+) of the comparators 50 included in the respective switching circuits 30, 32, 34, and 36, and the outputs of the comparators 50 may be increased. Thus, since the current driving ability of the NMOS transistor 52 is improved, the amount of current flowing into the NMOS transistor 52 may also increase as illustrated in FIG. 1. Therefore, the LED channel may be dimmed up.

On the other hand, when the dimming control unit 16 outputs the dimming control voltage at a low level, the dimming circuit 40 may output the adjustment voltage at a low level.

Figure 11:
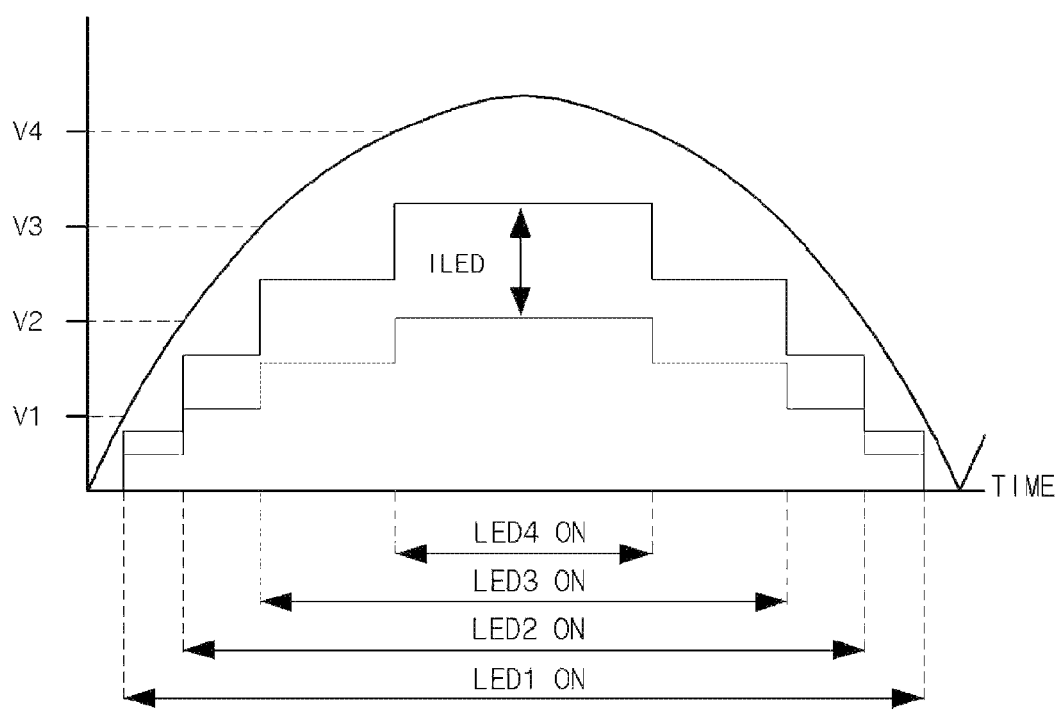
FIG. 11 is a waveform diagram illustrating a current control state in accordance with the embodiment of FIG. 8.

Then, the low-level reference voltages REF1 to REF4 may be applied to the positive terminals (+) of the comparators 50 included in the respective switching circuits 30, 32, 34, and 36, and the outputs of the comparators 50 may be decreased. Thus, since the current driving ability of the NMOS transistor 52 is degraded, the amount of current flowing into the NMOS transistor 52 may also decrease as illustrated in FIG. 11. Therefore, the LED channel may be dimmed down.

Figure 12:
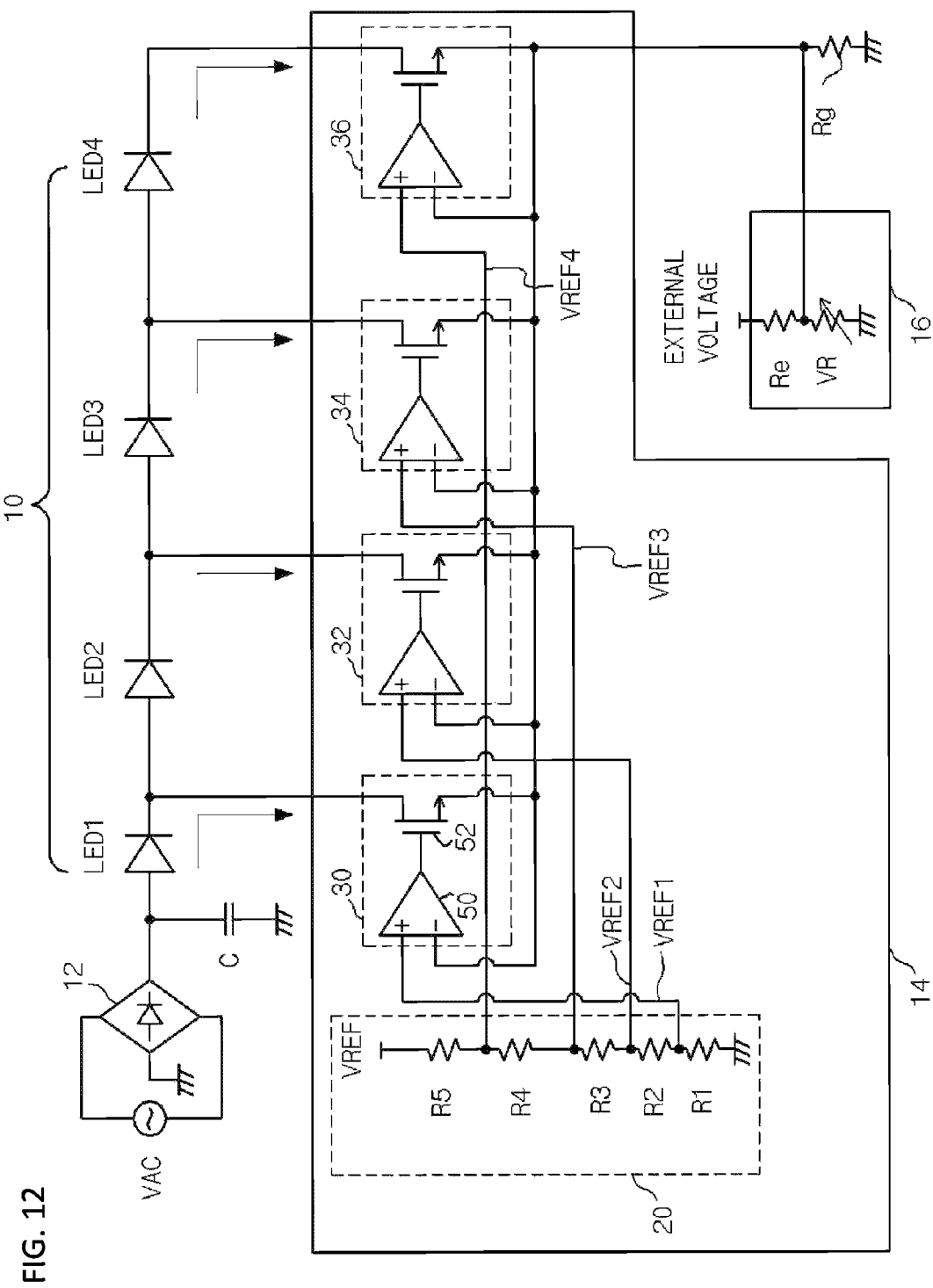
FIG. 12 is a circuit diagram illustrating a control circuit of an LED lighting apparatus in accordance with another embodiment of the present invention.

Furthermore, as illustrated in FIG. 12, the dimming control voltage may be provided to the current sensing resistor Rg forming a current sensing unit, in order to control dimming. That is, the current sensing resistor Rg may provide a voltage corresponding to a level obtained by adding the dimming control voltage and a voltage formed by a current introduced through formation of a current path, as a current sensing voltage. The dimming control voltage may be provided from the dimming control unit 16.

In FIG. 12, the same parts as those of FIG. 1 are represented by like reference numerals, and the duplicated descriptions thereof are omitted herein.

In the above-described configuration, the dimming control unit 16 may output the dimming control voltage through the node between the resistor Re and the variable resistor VR. As the resistance value of the variable resistor VR is varied, the dimming control voltage may be outputted to the current sensing resistor Rg.

Thus, the current sensing resistor Rg may commonly provide the current sensing voltage having a value which is varied according to the dimming control voltage, to the switching circuits 30, 32, 34, and 36.

When the output of the comparator 50 is increased in each of the switching circuits 30, 32, 34, and 36, the current driving ability of the NMOS transistor 52 may be improved. On the other hand, when the output of the comparator 50 is decreased in each of the switching circuits 30, 32, 34, and 36, the current driving ability of the NMOS transistor 52 may be degraded.

In the embodiment of the present invention, when the dimming control unit 16 outputs the dimming control voltage at a high level, the current sensing voltage of the current sensing resistor Rg may also be outputted at a high level.

Then, the high-level current sensing voltage may be applied to the negative terminals (−) of the comparators 50 included in the respective switching circuits 30, 32, 34, and 36, and the outputs of the comparators 50 may be decreased. Thus, since the current driving ability of the NMOS transistor is degraded, the amount of current flowing into the NMOS transistor 52 may also decrease. Therefore, the turned-on LED channel may be dimmed down.

On the other hand, when the dimming control unit 16 outputs the dimming control voltage at a low level, the current sensing voltage of the current sensing resistor Rg may also be outputted at a low level.

Then, the low-level current sensing voltage may be applied to the negative terminals (−) of the comparators 50 included in the respective switching circuits 30, 32, 34, and 36, and the outputs of the comparators 50 may be increased. Thus, since the current driving ability of the NMOS transistor is improved, the amount of current flowing into the NMOS transistor 52 may increase. Therefore, the LED channel may be dimmed up.

The dimming control method in accordance with the above-described embodiments of the present invention can control dimming using an external voltage inputted in an analog manner, thereby improving the convenience and satisfaction of users.

Furthermore, the dimming control method may be performed together with a dimming control method using a dimmer, and regulate the current of the lamp by using a pulse generated through an external voltage inputted in an analog manner or converting the external voltage into the dimming control voltage, thereby maximizing the convenience and satisfaction of users and improving the reliability of products.

Figure 13:
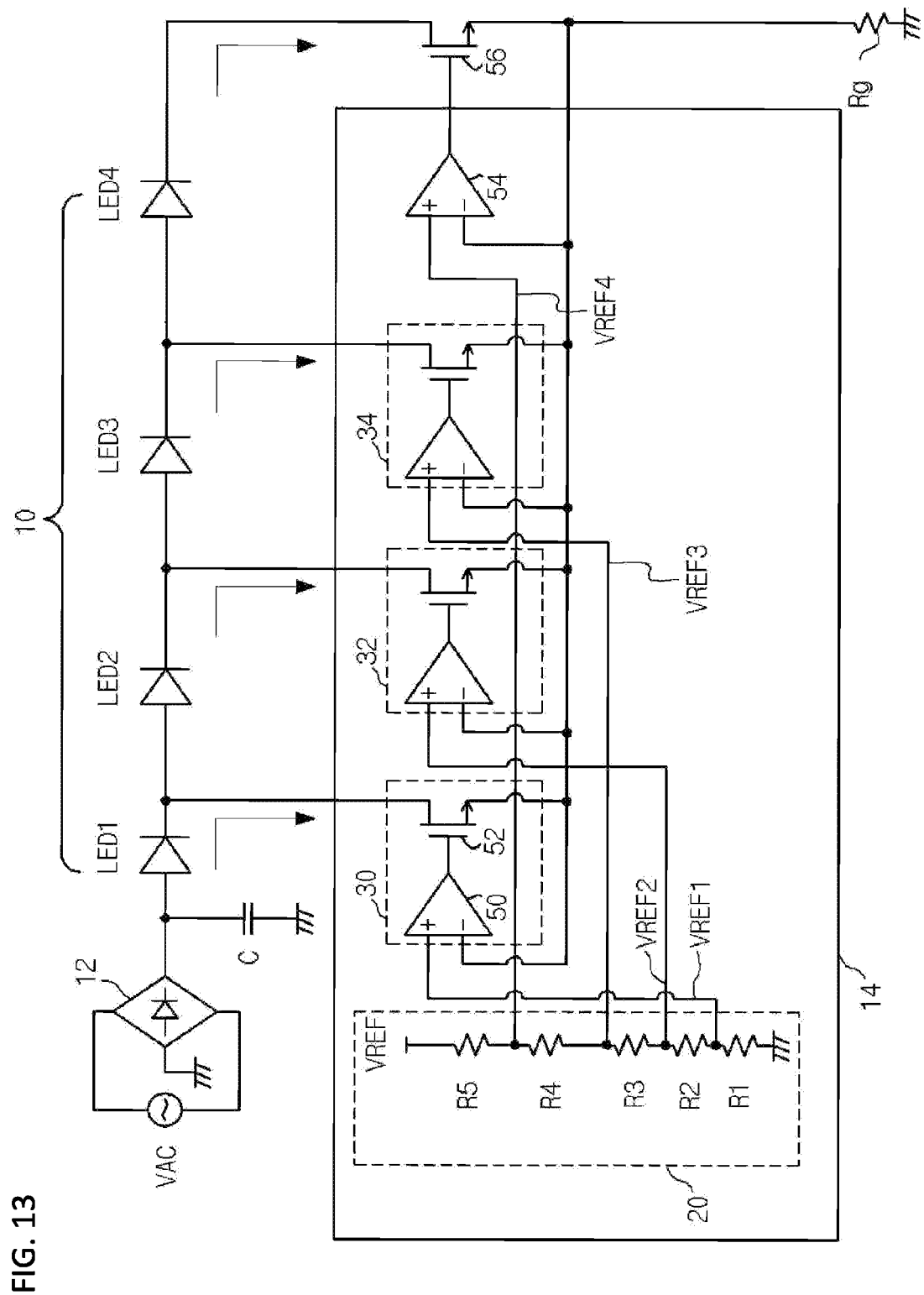
FIG. 13 is a circuit diagram illustrating a control circuit of an LED lighting apparatus in accordance with another embodiment of the present invention.

The control circuit of the LED lighting apparatus which is manufactured with a large capacity may be embodied as illustrated in FIG. 13, in order to secure the reliability of products while preventing a malfunction due to excessive heat.

In FIG. 13, the same parts as those of FIG. 1 are represented by like reference numerals, and the duplicated descriptions thereof are omitted herein.

Referring to FIG. 13, among switching elements which are switched to form a current path according to outputs of comparators, that is, NMOS transistors 52 and 56, the NMOS transistor 56 through which a relatively large amount of current flows may be arranged outside a chip including the control unit 14 mounted therein.

The control unit 14 may be implemented as one chip, and the plurality of NMOS transistors 52 may be included in a switching circuit forming the above-described current path within the chip.

Each of the NMOS transistors which are configured to form a current path in the control unit 14 of the LED lighting apparatus may pass a larger amount of current as the NMOS transistor is connected to an LED channel which emits light using a higher rectified voltage.

The LED lighting apparatus needs to pass a large amount of current to the control unit 14, in order to support a large capacity. However, the amount of current which can be passed through MOS transistors provided in the chip may be limited due to a heating problem.

For example, when the LED lighting apparatus is driven under a condition where the operating temperature of the chip is set to 125 degrees and the power of the lamp is equal to or more than 20 W, the actual temperature of the chip may rise to 150 degrees or more.

When the chip is heated at high temperature, the heat may have an influence on the light emitting voltage for turning on the lamp. In a severe case, the reliability of the product may be degraded.

In order to solve such a problem, a switching element generating a relatively large amount of heat among the switching elements forming the switching circuit may be arranged outside the chip, and a switching element generating a relatively small amount of heat may be arranged inside the chip.

At this time, a comparator for the operation of the switching element outside the chip may be mounted in the chip.

As the switching element generating a relatively large amount of heat is arranged outside the chip, the heat generation of the chip having the control unit 14 mounted therein can be controlled.

Therefore, although a large amount of current flows into the chip forming the control unit for controlling the current of the lamp when the LED lighting apparatus is manufactured with a large capacity, an abnormality of the voltage for driving the lamp due to excessive heat or the reduction in reliability of the product due to the thermal stress may be prevented, because the switching element generating a relatively large amount of heat is not integrated.

In another embodiment of the present invention, dimming control may be achieved in a digital manner.

Figure 14:
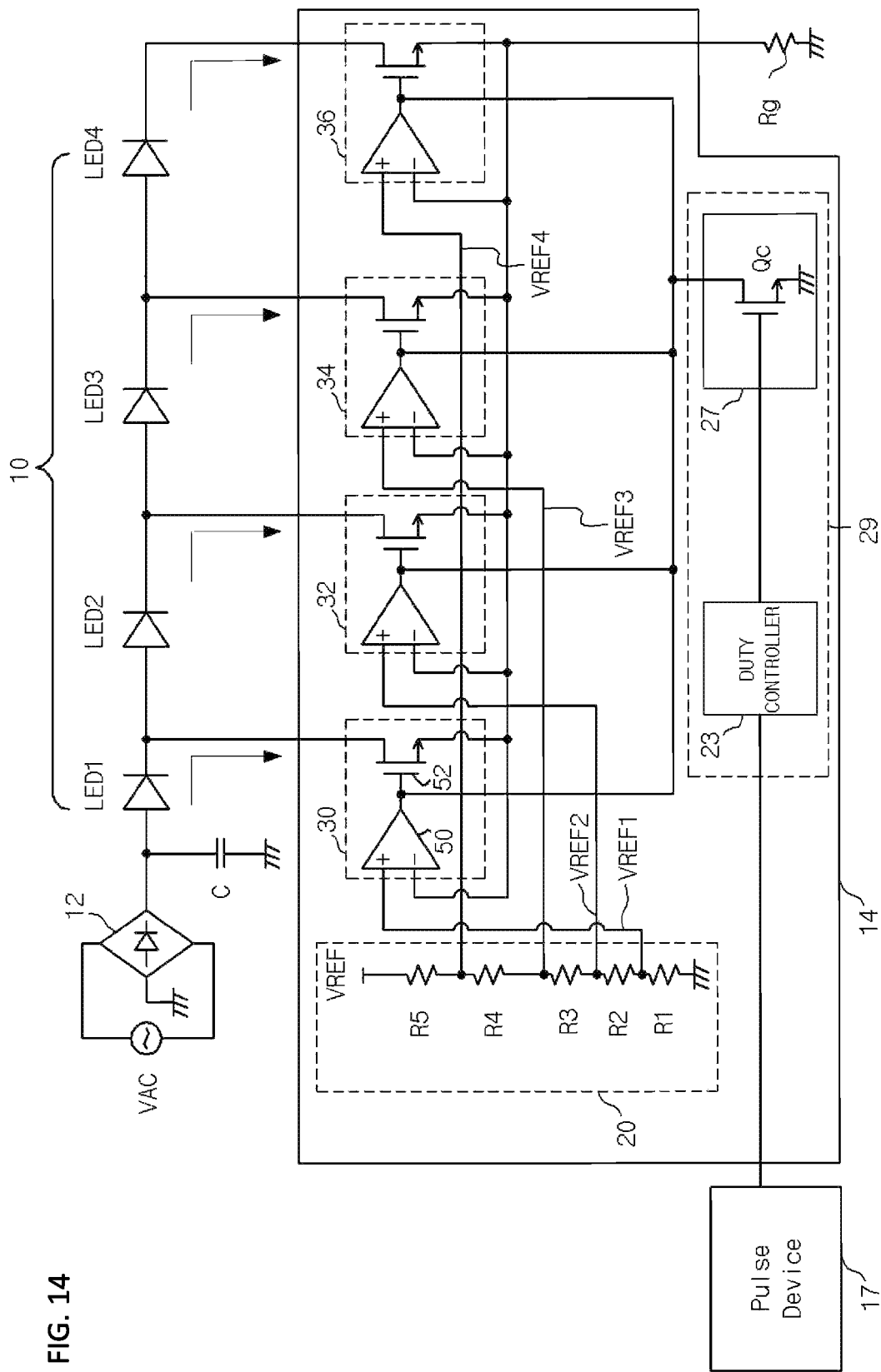
FIG. 14 is a circuit diagram illustrating a control circuit of an LED lighting apparatus in accordance with another embodiment of the present invention.

Referring to FIG. 14, the control unit 14 may include a dimming circuit 29 which includes a duty controller 23 and a pulse driver 27.

In the embodiment of FIG. 14, the control unit 14 may be configured to receive a dimming control pulse from an external pulse device 17 in a digital manner. The pulse device 17 may correspond to the dimming control unit 16 of FIG. 1, and the dimming control pulse may correspond to the dimming control signal.

The pulse device 17 may include a micro control unit (not illustrated) provided in an external device. The micro control unit may include a pulse generation circuit and a transmitter. The pulse generation circuit may generate a dimming control pulse to have a pulse width for controlling dimming of the lamp 10, and the transmitter may transmit the dimming control pulse in a digital manner. The duty of the dimming control pulse may be adjusted by an adjusting member such as a key or button which can be provided in the pulse device 17.

The duty controller 23 may receive the dimming control pulse, and generate a control pulse having a duty corresponding to the duty of the dimming control pulse.

The duty controller 23 may generate a control pulse having a cycle or pulse which is synchronized with the dimming control pulse, or generate a control pulse by performing one or more of signal compensation and filtering on the dimming control pulse.

The pulse driver 27 may include an NMOS transistor Qc, and be commonly connected to the gate of the switching element included in each of the switching circuits 30, 32, 34, and 36, that is, the NMOS transistor 52.

The control unit 14 having the dimming circuit 29 configured in the above-described manner may control the current amount of the current path which is selectively provided through the switching circuits 30, 32, 34, and 36 by the dimming control pulse having a duty corresponding to a desired dimming level.

More specifically, when the pulse device 17 provides the external dimming control pulse having a duty corresponding to the desired dimming level to the duty controller 23, the duty controller 23 may generate a control pulse having a duty corresponding to the duty of the dimming control pulse, and provide the generated control pulse to the pulse driver 27.

Figure 15A:
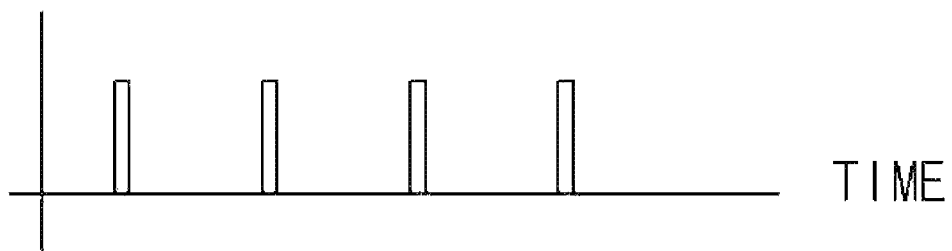
FIGS. 15A and 15B illustrate examples of a dimming control pulse.

At this time, when the pulse device 17 outputs a dimming control pulse having a small duty as illustrated in FIG. 15A, the duty controller 23 may provide a pulse having a small duty to the pulse driver 27.

Figure 15B:
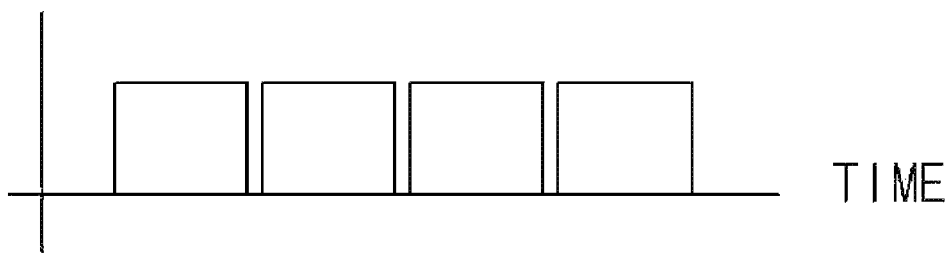

On the other hand, when the pulse device 17 outputs a dimming control pulse having a large duty as illustrated in FIG. 15B, the duty controller 23 may provide a control pulse having a large duty to the pulse driver 26.

The pulse driver 27 may be periodically turned on/off according to the control pulse. The pulse driver 26 may be turned on/off to have a long turn-on time in response to the control pulse having a large duty, and turned on/off to have a short turn-on time in response to the control pulse having a small duty.

When the pulse driver 27 is driven in the above-described manner, the gate voltages of the NMOS transistors 52 included in the switching circuits 30, 32, 34, and 36 may be changed.

That is, when the pulse driver 27 is turned on/off to have a long turn-on time, the NMOS transistors 52 of the switching circuits 30, 32, 34, and 36 may be turned on/off to have a short turn-on time.

On the other hand, when the pulse driver 27 is turned on/off to have a short turn-on time, the NMOS transistors 52 of the switching circuits 30, 32, 34, and 36 may be turned on/ff to have a long turn-on time.

For example, suppose that the rectified voltage rises to the light emitting voltage V1 at which the LED channel LED1 emits light, and the current path of the LED channel LED1 is provided by the switching circuit 30.

When the dimming control pulse having a large duty is applied, the pulse driver 27 may be driven in such a manner that the NMOS transistor 52 of the switching circuit 30 has a short light emitting time. As a result, the amount of current flowing into the NMOS transistor 52 may decrease. Thus, the LED channel LED1 may be dimmed down.

On the other hand, when the dimming control pulse having a small duty is applied, the pulse driver 27 may be driven in such a manner that the NMOS transistor 52 of the switching circuit 30 has a long light emitting time. As a result, the amount of current flowing into the NMOS transistor 52 may increase. Thus, the LED channel LED1 may be dimmed up.

In the embodiment of FIG. 14, current regulation and dimming control may be performed through the dimming control pulse inputted in a digital manner from outside.

The dimming control method using an external dimming control pulse in accordance with the embodiment of the present invention may be used together with the dimming control method using a dimmer.

FIG. 14 illustrates that the pulse driver 27 is commonly connected to the switching circuits 30, 32, 34, and 36, but the present invention is not limited thereto. The pulse driver 27 may correspond one-to-one to each of the switching circuits 30, 32, 34, and 36. At this time, the duty controller 23 may be configured to provide a control pulse to the plurality of pulse drivers 27 in common.

The embodiment of FIG. 14 may control the gate of the NMOS transistor 52 serving as the switching element included in each of the switching circuits 30, 32, 34, and 36, and control a current flow on the current path, in order to perform dimming control.

Figure 16:
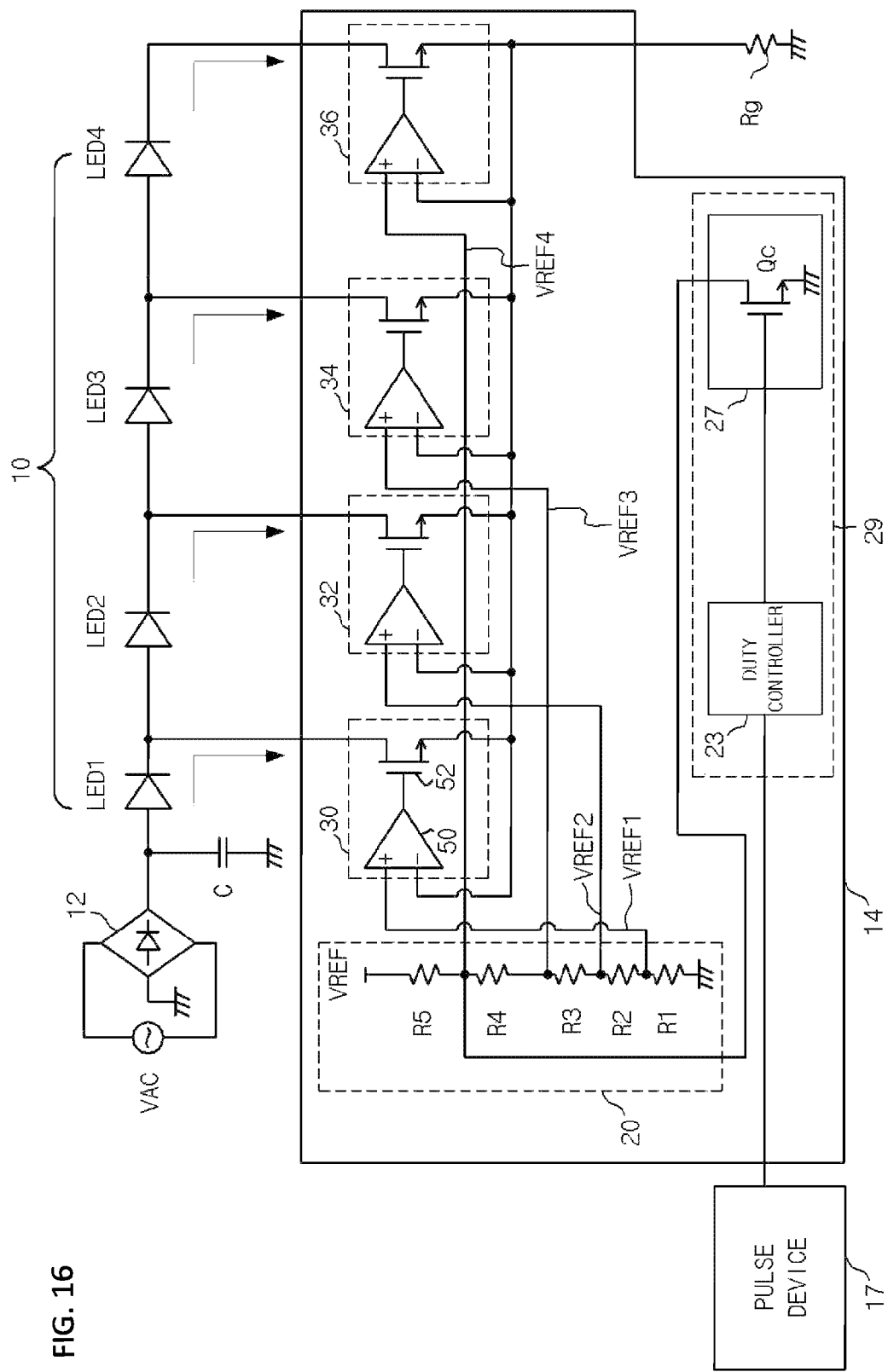
FIG. 16 is a circuit diagram illustrating a control circuit of an LED lighting apparatus in accordance with another embodiment of the present invention.

On the other hand, according to a producer's intention, the current amount for light emission of the lamp 10 may be adjusted by controlling the output of the reference voltage of the reference voltage supply unit 20, as illustrated in FIG. 16.

In FIG. 16, the same parts as those of FIG. 14 are represented by like reference numerals, and the duplicated descriptions thereof are omitted herein.

In an embodiment of FIG. 16, the pulse driver 27 may be connected to the node between resistors R5 and R4 of the reference voltage supply unit 20.

That is, the pulse driver 27 may be configured to drive the voltage of the node from which the highest reference voltage is outputted, among the nodes between the respective resistors formed in the reference voltage supply unit 20.

The pulse driver 27 may be periodically turned on/off according to the control pulse provided from the duty controller 23. The pulse driver 27 may be turned on/off to have a long turn-on time in response to a control pulse having a large duty, and turned on/off to have a short turn-on time in response to a control pulse having a small duty.

The level of the node between the resistors R5 and R4 of the reference voltage supply unit 20 may fall to the ground voltage when the NMOS transistor Qc of the pulse driver 27 is turned on, and rise to the reference voltage VREF4 when the NMOS transistor Qc of the pulse driver 26 is turned off. Furthermore, the voltages of the nodes from which the other reference voltages VREF1, VREF2, and VREF3 are outputted may swing between the ground voltage and the respective reference voltages in connection with the operation of the pulse driver 27.

When the pulse driver 27 is turned on so that the levels of the reference voltages VREF1 to VREF4 fall to the ground voltage, the current sensing voltages applied to the negative terminals (−) of the respective comparators 50 may have a higher level than the ground voltage. Thus, each of the comparator 50 may output a low-level voltage to the gate of the transistor 52. In connection with the operation of the comparators 50, the NMOS transistors 52 included in the switching circuits 30, 32, 34, and 36 may be turned off, and the current path is blocked.

Furthermore, when the pulse driver 27 is turned off so that the reference voltages VREF1 to VREF4 are restored, the respective comparators 50 may perform a normal operation according to the level of the rectified voltage. Thus, according to the level of the rectified voltage, a selective current path may be provided through the switching circuits 30, 32, 34, and 36.

That is, the outputs of the comparators 50 included in the respective switching circuits 30, 32, 34, and 36 may be controlled in connection with the operation of the pulse driver 27. As a result, the NMOS transistors 52 of the switching circuits 30, 32, 34, and 36 may be turned on/off in connection with a switching operation of the NMOS transistor Qc of the pulse driver 27.

The turn-on times of the NMOS transistors 52 of the switching circuits 30, 32, 34, and 36 and the NMOS transistor Qc of the pulse driver 26 may be determined according to the duty of a dimming control pulse.

That is, when the dimming control voltage having a large duty is applied, the pulse driver 27 may control the reference voltage, and the NMOS transistor 52 of the switching circuit 30 may be turned on/off to have a short turn-on time. As a result, the amount of current flowing into the NMOS transistor 52 may decrease. Therefore, the LED channel may be dimmed down.

On the other hand, when the dimming control pulse having a small duty is applied, the pulse driver 27 may control the reference voltage, and the NMOS transistor 52 of the switching circuit 30 may be turned on/off to have a long turn-on time. As a result, the amount of current flowing into the NMOS transistor 52 may increase. Therefore, the LED channel may be dimmed up.

In the embodiment of FIG. 16, the current regulation can also be controlled by the dimming control pulse inputted in a digital manner, and the dimming control can also be performed according to the dimming control pulse, like the embodiment of FIG. 14.

The above-described embodiments of the present invention can control dimming using an external voltage inputted in a digital manner, thereby improving the convenience and satisfaction of users.

Furthermore, the dimming control method may be performed together with a dimming control method using a dimmer, and regulate the current of the lamp or perform dimming control using a control pulse generated through an external dimming control pulse inputted in an analog manner, thereby maximizing the convenience and satisfaction of users and improving the reliability of products.

While various embodiments have been described above, it will be understood to those skilled in the art that the embodiments described are by way of example only. Accordingly, the disclosure described herein should not be limited based on the described embodiments.

What is claimed is:

1. A control circuit of an LED lighting apparatus which is divided into a plurality of LED channels, the control circuit comprising a control unit provides a current path corresponding to turn-on states of the LED channels in response to a rectified voltage, compares a current sensing voltage corresponding to the amount of current flowing through the current path to reference voltages in response to the plurality of LED channels in order to perform current regulation and to form the current path, generates a control pulse corresponding to an external dimming control signal therein, and controls a current amount of the current path by controlling at least one of a turn-on time of the current path and a supply time of the reference voltages according to the control pulse.

2. The control circuit of claim 1, further comprising a current sensing unit commonly connected to a plurality of switching circuits included in the control unit in order to provide the current path, wherein the current sensing unit provides the current sensing voltage for controlling the current path.

3. The control circuit of claim 1, wherein the control unit receives the dimming control signal from a dimming control unit provided outside, and the dimming control unit comprises a variable resistor and provides the dimming control signal corresponding to a resistance value of the variable resistor.

4. The control circuit of claim 1, wherein the control unit comprises:
 a reference voltage supply unit supplies the reference voltages having different levels to the respective LED channels;
 a plurality of switching circuits provided for the respective LED channels, and each comprising a comparator compares the current sensing voltage corresponding to the amount of current flowing through the current path to the reference voltages and a switching element provides the current path and switched by an output of the comparator; and
 a dimming circuit generates the control pulse corresponding to a level of the dimming control signal, and controls the current amount of the switching element in response to the control pulse.

5. The control circuit of claim 4, wherein the dimming circuit comprises:
 a level detector outputs a constant voltage corresponding to the level of the dimming control signal;
 a pulse generator generates the control pulse corresponding to a level of the constant voltage; and
 a pulse driver controls the current amount of the current path by controlling the turn-on time of the switching element in response to the control pulse.

6. The control circuit of claim 1, wherein the control unit comprises:
 a reference supply unit supplies the reference voltages having different levels to the respective LED channels;
 a plurality of switching circuits provided for the respective LED channels, and each comprising a comparator compares the current sensing voltage corresponding to the amount of current flowing through the current path to the reference voltages and a switching element provides the current path and switched by an output of the comparator; and
 a dimming circuit generates the control pulse corresponding to a level of the dimming control signal, and controls the current amount of the current path by controlling the output of the reference voltage of the reference voltage supply unit according to the control pulse.

7. The control circuit of claim 6, wherein the dimming circuit comprises:
 a level detector outputs a constant voltage corresponding to the level of the dimming control signal;
 a pulse generator generates the control pulse corresponding to the level of the constant voltage; and
 a pulse driver controls the current amount of the current path by controlling the supply time of the reference voltage in response to the control pulse.

8. The control circuit of claim 1, further comprises a pulse device provides the dimming control signal having a duty corresponding to a desired dimming level.

9. The control circuit of claim 8, wherein the pulse device comprises a micro control unit generates the dimming control signal therein and provides the generated dimming control signal to the control unit.

10. The control circuit of claim 8, wherein the control unit comprises:
 a reference voltage supply unit supplies the reference voltages having different levels to the respective LED channels;
 a plurality of switching circuits provided for the respective LED channels, and each comprising a comparator compares the current sensing voltage corresponding to the amount of current flowing through the current path to the reference voltages and a switching element provides the current path and switched by an output of the comparator; and
 a dimming circuit generates the control pulse corresponding to the duty of the dimming control signal, and controls the current amount of the current path by driving the switching element according to the control pulse.

11. The control circuit of claim 10, wherein the dimming circuit comprises:
 a duty controller generates the control pulse having a duty corresponding to the dimming control signal; and
 a pulse driver controls the current amount of the current path by controlling the turn-on time of the switching element in response to the control pulse.

12. The control circuit of claim 8, wherein the control unit comprises:
 a reference voltage supply unit supplies the reference voltages having different levels to the respective LED channels;
 a plurality of switching circuits provided for the respective LED channels, and each comprising a comparator compares the current sensing voltage corresponding to the amount of current flowing through the current path to the reference voltages and a switching element provides the current path and switched by an output of the comparator; and
 a dimming circuit generates the control pulse corresponding to the duty of the dimming control signal, and controls the current amount of the current path by controlling the output of the reference voltages of the reference voltage supply unit according to the control pulse.

13. The control circuit of claim 12, wherein the dimming circuit comprises:
 a duty controller generates the control pulse having a duty corresponding to the dimming control signal; and
 a pulse driver controls the current amount of the current path by controlling the supply time of the reference voltage in response to the control pulse.

14. A control circuit of an LED lighting apparatus which is divided into a plurality of LED channels, the control circuit comprising a control unit provides a current path corresponding to turn-on states of the LED channels in response to a rectified voltage, compares a current sensing voltage corresponding to the amount of current flowing through the current path to reference voltages in response to the plurality of LED channels in order to perform current regulation and to form the current path, and controls a current amount of the current path in response to a voltage corresponding to a level obtained by adding an external dimming control signal and a voltage formed by a current introduced through formation of the current path, as the current sensing voltage.

15. The control circuit of claim 14, wherein the control unit comprises:

a dimming circuit provides an adjustment voltage corresponding to the level of the external dimming control signal;

a reference voltage supply unit generates the reference voltages having different levels for the respective LED channels, varies the reference voltages to have a level corresponding to the adjustment voltage, and supplies the reference voltages; and a plurality of switching circuits provided for the respective LED channels, and each comprising a comparator compares the current sensing voltage to the reference voltage and a switching element switched by an output of the comparator in order to form the current path.

16. The control circuit of claim 15, wherein the reference voltage supply unit comprises a plurality of resistors connected in series between a supply voltage application terminal and a ground terminal, and the adjustment voltage is applied to the node from the highest reference voltage is outputted, among nodes between the respective resistors.

17. The control circuit of claim 14, wherein the control unit provides the external dimming control signal to the current path, and controls the current amount of the switching path in response to the level of the external dimming control signal.

18. The control circuit of claim 17, further comprising a current sensing unit commonly connected to a plurality of switching circuits which are included in the control unit in order to provide the current path, wherein the external dimming control signal is provided to the current sensing unit.

* * * * *